United States Patent [19]

Curfman et al.

[11] 4,182,820

[45] Jan. 8, 1980

[54] PROCESS FOR POLYMERIZATION OF STYRENE AND ACRYLONITRILE

[75] Inventors: Don C. Curfman, Washington; Gary D. Rea, Parkersburg, both of W. Va.

[73] Assignee: Borg-Warner Corporation, Chicago, Ill.

[21] Appl. No.: 913,614

[22] Filed: Jun. 8, 1978

[51] Int. Cl.$^2$ ............................................. C08F 212/10
[52] U.S. Cl. .................................. 526/212; 526/210; 526/342
[58] Field of Search ................ 526/210, 212, 222, 342

[56] References Cited

U.S. PATENT DOCUMENTS

| | | | |
|---|---|---|---|
| 3,629,211 | 12/1971 | Nozaki | 526/342 |
| 3,817,965 | 6/1974 | Mace et al. | 526/342 |
| 3,957,711 | 5/1976 | Powanda et al. | 526/341 |

OTHER PUBLICATIONS

Ugelstad et al., J. Pol. Sci., Polymer Letters Edition, vol. 11, pp. 503–513, (1973).

*Primary Examiner*—Harry Wong, Jr.
*Attorney, Agent, or Firm*—William S. McCurry

[57] ABSTRACT

A polymerization technique for the polymerization of styrene and acrylonitrile by a method intermediate between that of emulsion polymerization and suspension polymerization wherein the styrene and acrylonitrile monomers are first dispersed in water containing a small amount of surfactant and a high molecular weight alcohol to form very small droplets of monomer and then carrying out the polymerization using a free radical generating initiator.

2 Claims, No Drawings

PROCESS FOR POLYMERIZATION OF STYRENE AND ACRYLONITRILE

BACKGROUND OF THE INVENTION

Techniques of polymerizing styrene and acrylonitrile in an aqueous media are well known. Two of these techniques are emulsion polymerization and suspension polymerization. In the case of most emulsion polymerization systems, initiation and growth of polymer molecules occurs predominately in surfactant micelles or in aqueous solution and the resulting polymer dispersion (latex) is of relatively small particle size (e.g. 0.01 to 1 μm). In a suspension polymerization system, initiation and growth of polymer molecules occurs predominantly in the monomer droplets and the resulting polymer dispersion (suspension) is of relatively large particle size (e.g. 20–2,000 μm).

SUMMARY OF THE INVENTION

The present invention relates to a polymerization technique which appears to be intermediate between that of emulsion polymerization and suspension polymerization can give some of the benefits of each. In the present polymerization process the monomers to be polymerized are first dispersed in water containing a small amount of surfactant and a high molecular weight alcohol. The monomers which are then in the form of very small droplets are polymerized using a free radical generating initiator.

The polymerization can be carried out using most conventional emulsion polymerization reactors and charging procedures. However, for this polymerization technique the monomers must be properly dispersed in water before the polymerization is initiated.

EXAMPLE

The following example will serve to illustrate the practice of the present invention:

| RECIPE INGREDIENTS | PARTS |
|---|---|
| Solution 1 | |
| Water | 90.17 |
| Sodium Alkylbenzene Sulfonate | 0.39 |
| 1-octadecanol | 0.61 |
| Solution 2 | |
| Styrene | 70.0 |
| Acrylonitrile | 30.0 |
| Tertiary-Dodecylmercaptan | 0.41 |
| Solution 3 | |
| Water | 9.83 |
| Potassium Peroxydisulfate | 0.25 |

Solution 1 was prepared by dissolving the emulsifier in water, heating the solution to 70° C., then adding the alcohol while continually stirring to ensure adequate mixing. Solutions 2 and 3 were prepared by mixing the ingredients of each together at ambient temperature.

The reaction was started by filling the reactor one fourth full of solution 1. The three solutions were then continuously added to the reactor until its capacity was reached. Overflow was started and the reaction was one of continuous addition and removal throughout the course of the polymerization. The addition rates were such that the average retention time in the reactor was 100 minutes.

Solution 1 was maintained at approximately 60° C. and a pH of 7.0. Solutions 1 and 2 were continuously metered into a mixpot, which overflowed into the reactor after an average residence time of five minutes. This was sufficient mixing time to ensure that the monomers were adequately dispersed. Solution 3 was continually metered to the reactor where it was mixed with the monomer dispersion at 70° C. for 100 minutes to ensure high conversion of monomer to polymer. Latex samples from the overflow stream were collected and tested periodically during the polymerization.

The copolymer produced by this process was isolated using aluminum sulfate, dried and tested. The test results are listed below and compared to a 70-30 styrene-acrylonitrile copolymer produced commercially using a conventional emulsion polymerization process. Similarities between the two processes include pre-emulsion and reaction equipment, residence time in each, type of emulsifier, monomer composition and continuous polymerization process.

The process of this invention differed from the commercial emulsion processes in that it contained a long chain fatty alcohol, a lower level of emulsifier, and used a thermally activated initiator instead of a redox activated initiator. Also reaction temperatures and solids content were slightly different.

Table I

| Property | | SAN of Example | Commercial SAN |
|---|---|---|---|
| Melt Index at 410 F. | | 1.17 A ½ | 0.6 A 1 |
| Molecular Weight | | 53,000 | 64,000 |
| Percentage of Area in High Molecular Weight Mode | | 15 | 34 |
| Color and Color Stability | | | |
| Transmission % | 5 min. | 87.76 | 68.81 |
| | 30 min. | 87.07 | 67.96 |
| Haze % | 5 min. | 4.01 | 59.46 |
| | 30 min. | 3.38 | 54.06 |
| Yellowness Index Trans. | 5 min. | 10.87 | 24.35 |
| | 30 min. | 15.46 | 33.55 |

Below is a list of polymerization ingredients and limits on each that can be used in carrying out the polymerization process of the present invention:

Table II

| RECIPE INGREDIENTS | PARTS |
|---|---|
| Water | 100–180 |
| Sodium Alkylbenzene Sulfonate | 0.39–0.72 |
| 1-octadecanol | 0.28–0.61 |
| Styrene | 30–70 |
| Acrylonitrile | 70–30 |
| Potassium Peroxydisulfate | 0.25 |
| Tertiary-Dodecylmercaptan | 0.41 |

In place of styrene, other monovinylidene aromatic hydrocarbons may be used such as alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, and the like, and mixtures thereof.

In place of acrylonitrile, other unsaturated nitriles such as methacrylonitrile and ethacrylonitrile may be employed.

Other emulsifiers that have been used with varying success include potassium oleate, sodium dresinate and the potassium salt of a hydrogenated mixture of long chain fatty acids. The redox initiating system, using cumene hydroperoxide, sodium formaldehyde sulfoxylate and chelated iron, was also used in this process.

The term "parts" as used herein means parts by weight unless otherwise indicated.

We claim:

1. A method for the production of copolymers of styrene and acrylonitrile which comprises preparing a first mixture of from about 0.39 to about 0.72 parts of an emulsifier selected from the group consisting of sodium alkylbenzene sulfonate, potassium oleate, sodium dresinate and the potassium salt of a hydrogenated mixture of long chain fatty acids, from about 0.28 to about 0.61 parts of a dispersing agent comprising a long chain fatty alcohol, and from about 100 to about 180 parts of water, preparing a second mixture of from about 30 to about 70 parts of styrene monomer and correspondingly from about 70 to 30 parts of acrylonitrile monomer, adding said second mixture to said first mixture, and heating said resultant mixture for a period of about 100 minutes at a temperature of 70° C.

2. A method in accordance with claim 1 wherein the emulsifier is sodium alkylbenzene sulfonate and the dispersing agent is 1-octadeconol.

* * * * *